US010676072B2

(12) United States Patent
Belanger et al.

(10) Patent No.: US 10,676,072 B2
(45) Date of Patent: *Jun. 9, 2020

(54) VEHICLE WASH COMPONENT

(71) Applicant: Belanger, Inc., Hamilton, OH (US)

(72) Inventors: Michael J. Belanger, Northville, MI (US); Thomas E. Weyandt, Northville, MI (US); Jerry A. Kotrych, Livonia, MI (US); Barry S. Turner, Novi, MI (US)

(73) Assignee: WashMe Properties, LLC, Northville, MI (US)

( * ) Notice: Subject to any disclaimer, the term of this patent is extended or adjusted under 35 U.S.C. 154(b) by 346 days.

This patent is subject to a terminal disclaimer.

(21) Appl. No.: 15/652,017

(22) Filed: Jul. 17, 2017

(65) Prior Publication Data
US 2017/0313289 A1 Nov. 2, 2017

Related U.S. Application Data

(63) Continuation of application No. 14/182,941, filed on Feb. 18, 2014, now Pat. No. 9,714,011, which is a
(Continued)

(51) Int. Cl.
*B60S 3/06* (2006.01)
*A46B 13/00* (2006.01)
*A46B 5/00* (2006.01)

(52) U.S. Cl.
CPC ............... *B60S 3/06* (2013.01); *A46B 5/00* (2013.01); *A46B 5/005* (2013.01); *A46B 5/0033* (2013.01);
(Continued)

(58) Field of Classification Search
CPC .................... B60S 3/06; B60S 3/063
See application file for complete search history.

(56) References Cited

U.S. PATENT DOCUMENTS

2010/0017979 A1* 1/2010 Ennis ............... B60S 3/063
15/53.3
2013/0019419 A1* 1/2013 Favagrossa ........... B60S 3/002
15/53.1
(Continued)

FOREIGN PATENT DOCUMENTS

DE 202005005758 U1 6/2005
WO 2013067378 A1 5/2013

OTHER PUBLICATIONS

EPO International Search Report dated May 25, 2018 and Australian Examination Report No. 1 for Standard Patent Application dated Jun. 5, 2018.

*Primary Examiner* — Randall E Chin
(74) *Attorney, Agent, or Firm* — Dickinson Wright, PLLC

(57) ABSTRACT

A vehicle wash component includes a hub portion with a first hub section and a second hub section. The first hub section includes a first distal end and a first proximate end opposite the first distal end. The first hub section defines a first axis of rotation. The second hub section includes a second distal end and a second proximate end opposite the second distal end. The second hub section defines a second axis of rotation. A connector device rotatably couples the first hub section to the second hub section. An actuator is in communication with the first hub section to effectuate movement of the first distal end between a retracted position and an extended position. In the retracted position, the first axis of rotation and the second axis of rotation are parallel. In the extended position, the first axis of rotation is at a non-90 angle with respect to the second axis of rotation.

45 Claims, 16 Drawing Sheets

Related U.S. Application Data continuation-in-part of application No. 13/668,029, filed on Nov. 2, 2012, now Pat. No. 9,199,613, which is a continuation-in-part of application No. 13/668,058, filed on Nov. 2, 2012, now Pat. No. 8,990,993, which is a continuation-in-part of application No. 13/668,121, filed on Nov. 2, 2012, now Pat. No. 9,248,809, which is a continuation-in-part of application No. 13/668,093, filed on Nov. 2, 2012, now Pat. No. 8,819,887, application No. 15/652,017, which is a continuation-in-part of application No. 13/864,813, filed on Apr. 17, 2013, now Pat. No. 10,207,686.

(60) Provisional application No. 61/554,559, filed on Nov. 2, 2011, provisional application No. 61/556,893, filed on Nov. 8, 2011, provisional application No. 61/642,831, filed on May 4, 2012, provisional application No. 61/800,769, filed on Mar. 15, 2013.

(52) U.S. Cl.
CPC .......... *A46B 5/0041* (2013.01); *A46B 5/0075* (2013.01); *A46B 13/001* (2013.01); *B60S 3/063* (2013.01); *A46B 2200/3046* (2013.01)

(56) References Cited

U.S. PATENT DOCUMENTS

| | | |
|---|---|---|
| 2014/0223676 A1 | 8/2014 | Belanger |
| 2015/0210252 A1 | 7/2015 | Belanger |

\* cited by examiner

VEHICLE WASH COMPONENT

CROSS-REFERENCE TO RELATED APPLICATIONS

The present application is a continuation of U.S. patent application Ser. No. 14/182,941, entitled "Vehicle Wash Component", filed Feb. 18, 2014, now U.S. Pat. No. 9,714,011, which is a continuation in part of U.S. patent application Ser. No. 13/668,029, entitled "An Improved Media Element for a Vehicle Wash Component", filed Nov. 2, 2012, now U.S. Pat. No. 9,199,613; which is a continuation in part of U.S. patent application Ser. No. 13/668,058, entitled "Vehicle Wash Component", filed Nov. 2, 2012, now U.S. Pat. No. 8,990,993; which is a continuation in part of U.S. patent application Ser. No. 13/668,121, entitled "Hub for a Vehicle Wash Component Having an Arcuate Pattern of Media Elements", filed Nov. 2, 2012, now U.S. Pat. No. 9,248,809; which is a continuation in part of U.S. patent application Ser. No. 13/668,093, entitled "Illuminated Hub for a Vehicle Wash Component", filed Nov. 2, 2012, now U.S. Pat. No. 8,819,887, all of which claim priority to U.S. Provisional Patent Application Ser. No. 61/554,559, entitled "Car Wash Implement and Splayable Foam Plastic Element for Use in Constructing Same", filed on Nov. 2, 2011; U.S. Provisional Patent Application Ser. No. 61/556,893, entitled "Injection Molded Foamed Polymeric Car Wash Media", filed on Nov. 8, 2011; and U.S. Provisional Patent Application Ser. No. 61/642,831, entitled "Top Brush", filed on May 4, 2012, the disclosures of which are hereby incorporated by reference as though set forth fully herein.

The present application is also a continuation in part of U.S. patent application Ser. No. 13/864,813, entitled "A Vehicle Wash Component for Emitting Bubbles", filed Apr. 17, 2013, now U.S. Pat. No. 10,207,686, which claims priority to U.S. Provisional Patent Application Ser. No. 61/800,769, entitled "Bubble Arch Device", filed on Mar. 15, 2013, the disclosures of which are hereby incorporated by reference, as though set forth fully herein.

TECHNICAL FIELD

The present disclosure generally relates to a vehicle wash component for use in cleaning an exterior surface of a vehicle. More particularly, the present disclosure relates to a vehicle wash component that provides for improved contact with and cleaning of a vehicle exterior during a vehicle wash process.

BACKGROUND OF THE INVENTION

A fundamental objective of a vehicle wash system is to provide a process that thoroughly washes and cleans the exterior surface of a vehicle. The ability to achieve this objective depends, in large part, on the configuration and function of the vehicle wash components that treat the vehicle exterior. Many different types of vehicle wash components exist for washing and removing dirt from a vehicle exterior. One such current vehicle wash component is configured as a rotary brush with a plurality of media elements secured to a rotating hub. As a vehicle is conveyed through the vehicle wash facility, the rotary brush rotates and the media elements contact the exterior of the vehicle to remove dirt from and clean the vehicle exterior. Multiple rotary brushes are generally disposed adjacent a vehicle treatment area in the vehicle wash facility and contact the top surface (top brush) and side surfaces (side brushes) of a vehicle to clean the entire exterior surface.

While these rotary brushes work satisfactorily, they have known limitations. For example, most current rotary side brushes are oriented such that their axis of rotation is generally perpendicular to the ground. By this configuration, the media elements each extend the same distance into the vehicle treatment area. This provides sufficient cleaning for a vehicle having a side surface that is also generally perpendicular to the ground. However, current rotary brushes have cleaning limitations for vehicles with large angled side surfaces. This is because contact between the media elements of the rotary side brush and the large angled side surface of the vehicle is decreased due to the fact that the media elements do not extend into the vehicle treatment area a sufficient distance to contact the entirety of the angled side surface. As such, the quality of the cleaning is significantly reduced.

In an attempt to overcome this limitation, vehicle wash components have been introduced where the axis of rotation of the rotary brush can be moved from a vertical position to a fixed angled position in an effort to correspond to an angled exterior surface of the vehicle. By this configuration, the upper media elements of the brushes extend further into the vehicle treatment area and can thus better engage an angled upper surface of a vehicle. On the other hand, the media elements on the lower portions of the brush are disposed further away from the vehicle treatment area. Thus, while these tilted rotary brushes provide improved cleaning on the upper angled surfaces of the vehicle exterior, the quality of cleaning on the lower vertical surfaces of the vehicle is known to suffer. In other words, while the upper media elements engage the angled surface of the vehicle exterior, the lower media elements often do not sufficiently engage the lower vertical surfaces to provide the desired cleaning.

Another issue with current vehicle wash components is their inability to provide consistent cleaning for all vehicle widths. For example, while current vehicle wash components provide acceptable cleaning for some vehicle sizes and widths, they often are unable to provide the same cleaning of other vehicle sizes.

SUMMARY OF THE INVENTION

It is therefore an aspect of the present disclosure to provide a vehicle wash component that provides consistent cleaning for vehicles of different widths and sizes.

It is another aspect of the present disclosure to provide a vehicle wash component that provides improved cleaning for vehicles having exteriors with different contours and shapes.

It is still another aspect of the present disclosure to provide a vehicle wash component that is configurable to match the exterior surface of the vehicle to be cleaned.

It is yet a further aspect of the present disclosure to provide a vehicle wash system that operates under computer control to provide synchronized lighted vehicle wash components.

It is a further aspect of the present disclosure to provide a vehicle wash component that generates less noise during operation than existing vehicle wash components.

It is yet another aspect of the present disclosure to provide a vehicle wash component that yields significant energy savings for a vehicle wash operator.

It is still yet another aspect of the disclosure to provide a vehicle wash component that provides a more enjoyable vehicle wash experience for customers.

It is still a further aspect of the present disclosure to provide a vehicle wash component where the position of the vehicle wash component is determined by the geometry of the vehicle.

In accordance with the above and the other aspects of the present disclosure, an improved vehicle wash component is provided. The vehicle wash component includes a first brush portion and a second brush portion. The first brush portion includes a first distal end and a first proximate end opposite the first distal end. The first brush portion also includes a first rotary hub which defines a first axis of rotation. The second brush portion is in communication with the first brush portion and includes a second distal end and a second proximate end opposite the second distal end. The second brush portion also includes a second rotary hub, which defines a second axis of rotation. The first rotary hub is rotatably coupled to the second rotary hub. An actuator is in communication with the first hub to effectuate movement of the first distal end between an extended position and a retracted position. In the retracted position, the first axis of rotation and the second axis of rotation are generally parallel. In the extended position, the first axis of rotation is at an angle with respect to the second axis of rotation.

In accordance with another aspect of the disclosure, a vehicle wash component includes an upper brush portion and a lower brush portion. The lower brush portion includes a lower rotary hub defining a lower axis of rotation. The lower hub portion has a plurality of media elements secured thereto. The upper brush portion includes an upper rotary hub defining an upper axis of rotation. The upper rotary hub has a plurality of media elements secured thereto. The upper rotary hub and the lower rotary hub are rotatably coupled for rotation in unison. The component is configured such that the lower axis of rotation and the upper axis of rotation may be different.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE INVENTION

Figure 1:
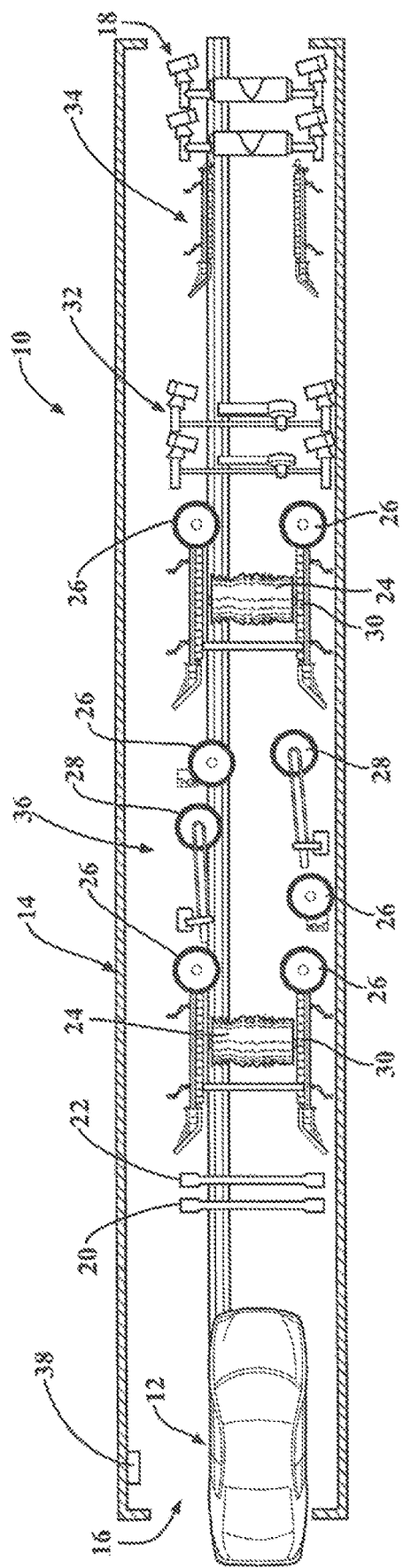
FIG. 1 is a perspective view of a vehicle wash system having a plurality of vehicle wash components in accordance with an aspect of the disclosure.

According to an aspect, the present disclosure relates to a vehicle wash system 10. As shown in FIG. 1, the system 10 may be configured as a tunnel car wash, where a vehicle 12 is conveyed through the wash process by a conveyor or the like as is known in the art. Alternatively, the vehicle wash system 10 may be configured as a roll-over type where the vehicle 12 remains stationary and the components move with respect to the vehicle 12. Other suitable wash processes and systems may also be employed. According to an aspect, the vehicle wash system 10 may be housed within a vehicle wash facility 14 having an entrance end 16 where a vehicle enters and an exit end 18 where the vehicle leaves. According to a further aspect, the vehicle wash system 10 may also include a variety of vehicle wash components that engage and/or treat the exterior of the vehicle 12 as it passes through the vehicle wash facility 14 to effectuate the vehicle wash process.

According to an aspect, the vehicle wash system 10 may include a variety of vehicle wash components. For example, as illustratively shown in FIG. 1, the vehicle wash system 10 can include a rinse arch 20, which sprays water onto the vehicle. The system can also include a bubble device 22 that generates bubbles and emits them directly onto the vehicle exterior. An exemplary bubble device 22 that may be employed with the disclosed system is disclosed in Applicant's co-pending U.S. patent application Ser. No. 13/864,813, entitled "A Vehicle Wash Component for Emitting Bubbles", filed Apr. 17, 2013, now U.S. Pat. No. 10,207,686, the disclosure of which is hereby incorporated by reference. The system 10 can also include one or more top brushes 24 for contacting a top exterior surface of the vehicle, a plurality of side brushes 26 for contacting side exterior surfaces, and a plurality of wrap brushes 28. The system 10 may also include wheel scrubbers 30, for engaging the vehicle wheels. The system can also include a drying section 32. According to a further aspect, the system can include a wheel polishing device 34. It will be appreciated that more, less or different wash components may be employed. Additionally, multiples of the same components may be employed as desired. Further, the components may take on a variety of different configurations. Moreover, the order, placement and sequence of the components within the system 10 may also vary. According to an aspect, the components are designed to engage and/or treat a vehicle 12 disposed within a vehicle treatment area 36 of the vehicle wash facility 14.

According to an aspect, the vehicle wash system 10 may include a controller 38 so that the system 10, including the various components, may operate automatically under computer control. According to another aspect, the controller 38 may be employed to control the operation and timing of the vehicle wash components. For example, the controller 38 could signal certain vehicle components to start operating as a vehicle approaches and then signal them to shut down after the vehicle has passed. It will be appreciated that a computer, processor or other suitable control device may alternatively be employed to control the system and its components. According to further aspect, each of the vehicle wash components i.e., 20, 22, 24, 26, 28, 30, 32 and 34 utilized in the vehicle wash system 10 can include a light source incorporated therein.

According to a further aspect, the light sources may be incorporated into each of the vehicle wash components. For example, with respect to the rotating vehicle wash components, they may be incorporated so that they rotate with the components as they operate. A suitable light source and its attachment to a vehicle wash component, are disclosed in Applicant's co-pending U.S. patent application Ser. No. 13/668,093, entitled "Illuminated Hub for a Vehicle Wash Component", filed Nov. 2, 2012, now U.S. Pat. No. 8,819,887, the disclosure of which is hereby incorporated by reference as though set forth fully herein. It will be appreciated that more or less light sources may be incorporated into each component. Additionally, the light sources may take on a variety of different configurations and may be incorporated into the components in a variety of different ways.

According to an aspect, the light sources on each of the rotary components 24, 26, 28 may be configured to emit lights of different colors sequentially. According to another aspect, the light sources may each be in communication with the controller 38 so that they may be programmed to emit the same color from each of the components in synchronization or unison. According to a further aspect, the controller 38 could be configured so that the top brushes 24 and the side brush 26 each emit the same color simultaneously. For example, the controller 38 could be programmed to emit the following color sequence from each component: the blue, followed by the red, followed by the green, followed by the yellow. It will be appreciated that an infinite number of different colors could be emitted from the components. It will also be appreciated that various combinations of colors or even multiple colors could be emitted from each component at the same time. According to a still further aspect, the controller 38 could be configured to emit different colors from each of the components at the same time. It will be appreciated that any sequence, order or placement of colors may be employed.

According to yet another aspect, one or more bubble light sources could be disposed adjacent the bubble device 22 to project light onto the bubbles emitted therefrom. Again, these bubble light sources could be configured to emit light in a multitude of different colors. It will be appreciated that the bubble light sources could also be in communication with the controller 38 such that these bubble light sources could be synchronized with the light sources associated with the other components such that they all emit the same color at the same time. Again, according to another aspect, the bubble light sources could be configured to emit different colors than those emitted from the other components at the same or different times. Again, the bubble light sources and the component light sources could be configured to emit colors in any respective combination.

FIGS. 2 through 5 and 6 through 8 illustrate an exemplary brush assembly 100 according to an aspect of the disclosure. The brush assembly 100 may be configured as a side brush for contacting an exterior side surface of a vehicle. It will be appreciated, however, that that brush assembly 100 may be configured and oriented to contact other surfaces of a vehicle. For example, the brush assembly 100 may be configured as a top brush for contacting an upper exterior surface of a vehicle. According to a still further aspect of the disclosure, the brush assembly 100 may be utilized for other applications outside of a vehicle wash system.

Figure 2:
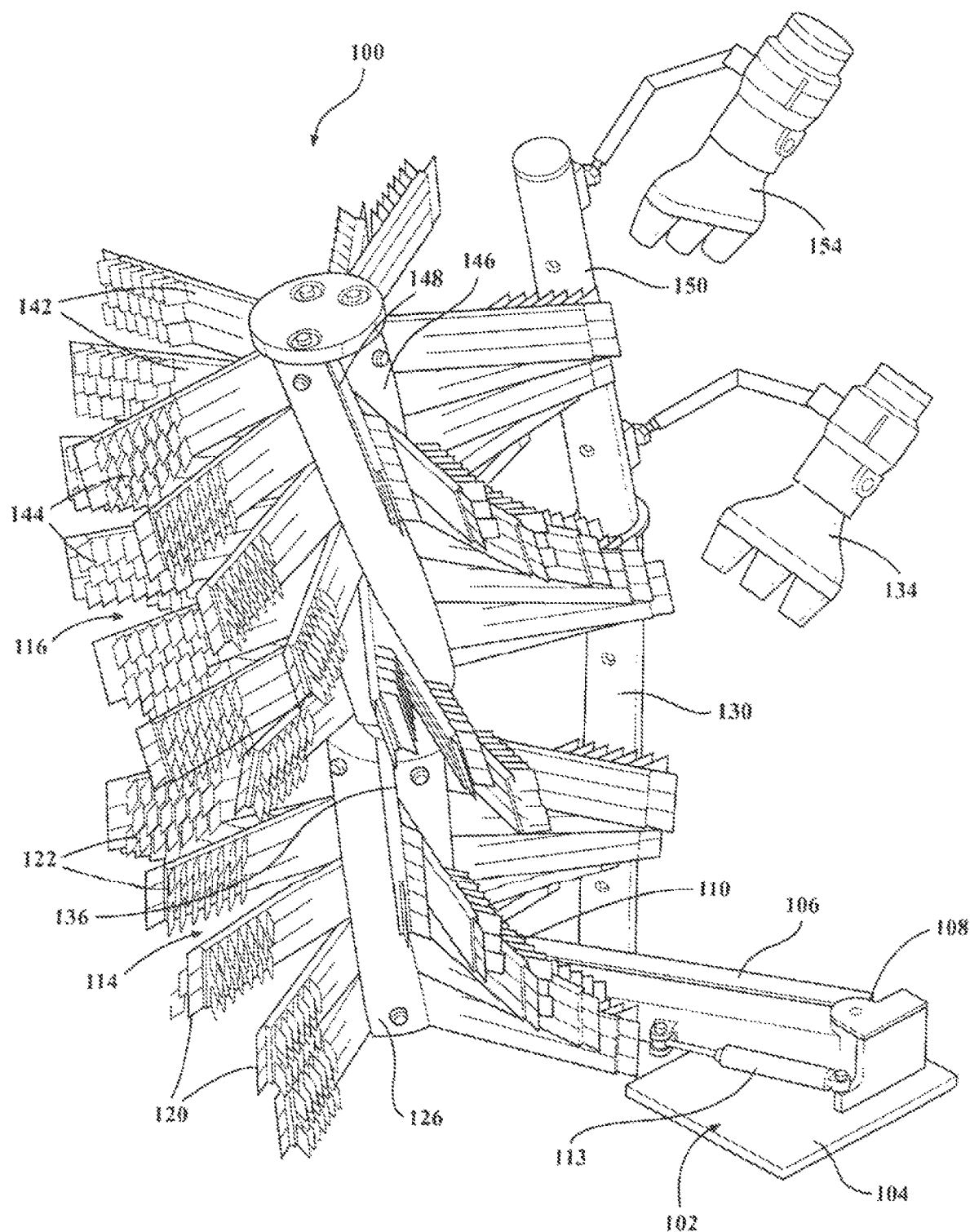
FIG. 2 is perspective view of a vehicle wash component for a vehicle wash system in an extended position in accordance with an aspect of the disclosure.
Figure 3:
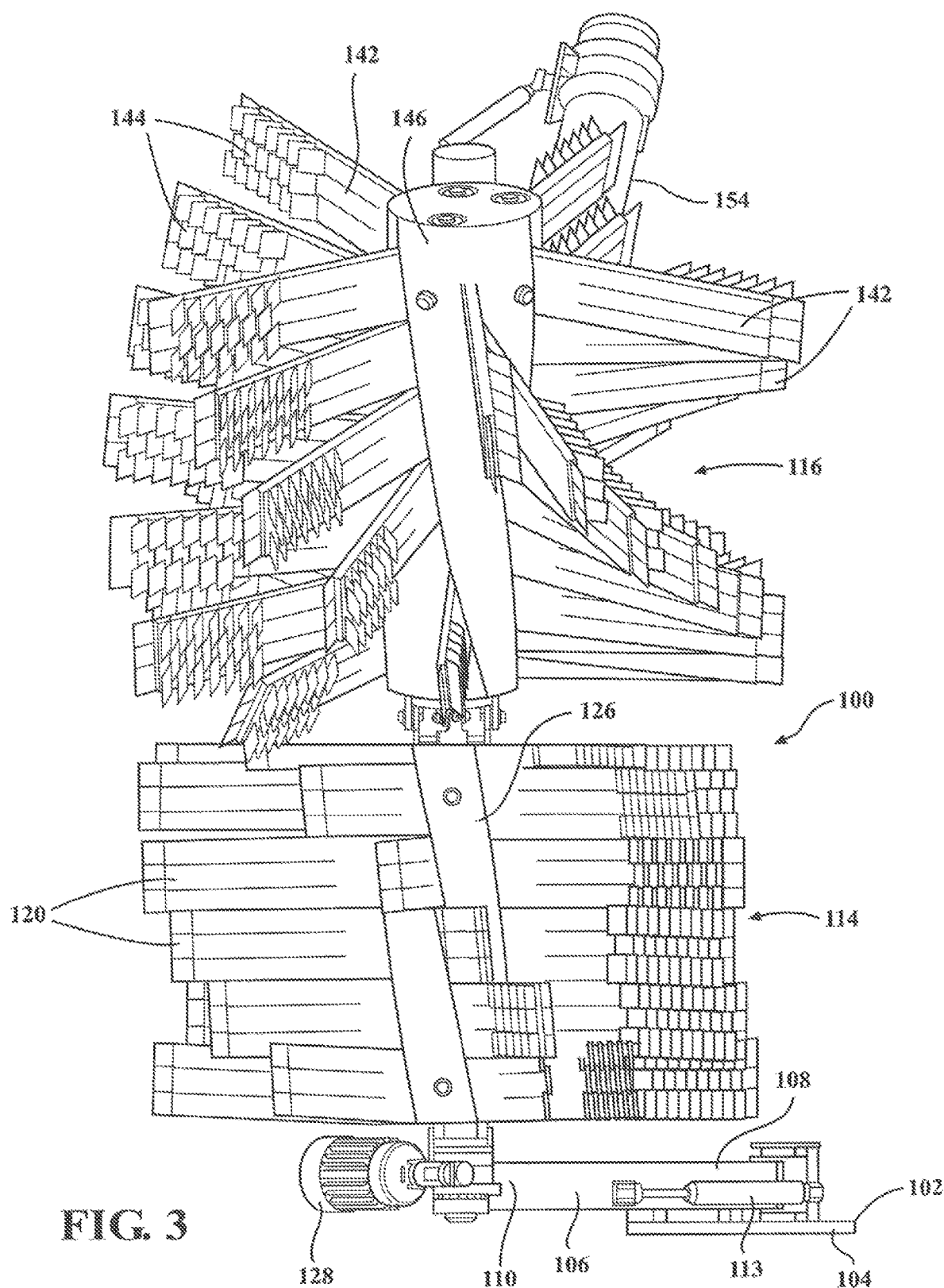
FIG. 3 is a first side view of the vehicle wash component of FIG. 2 in an extended position.
Figure 4:
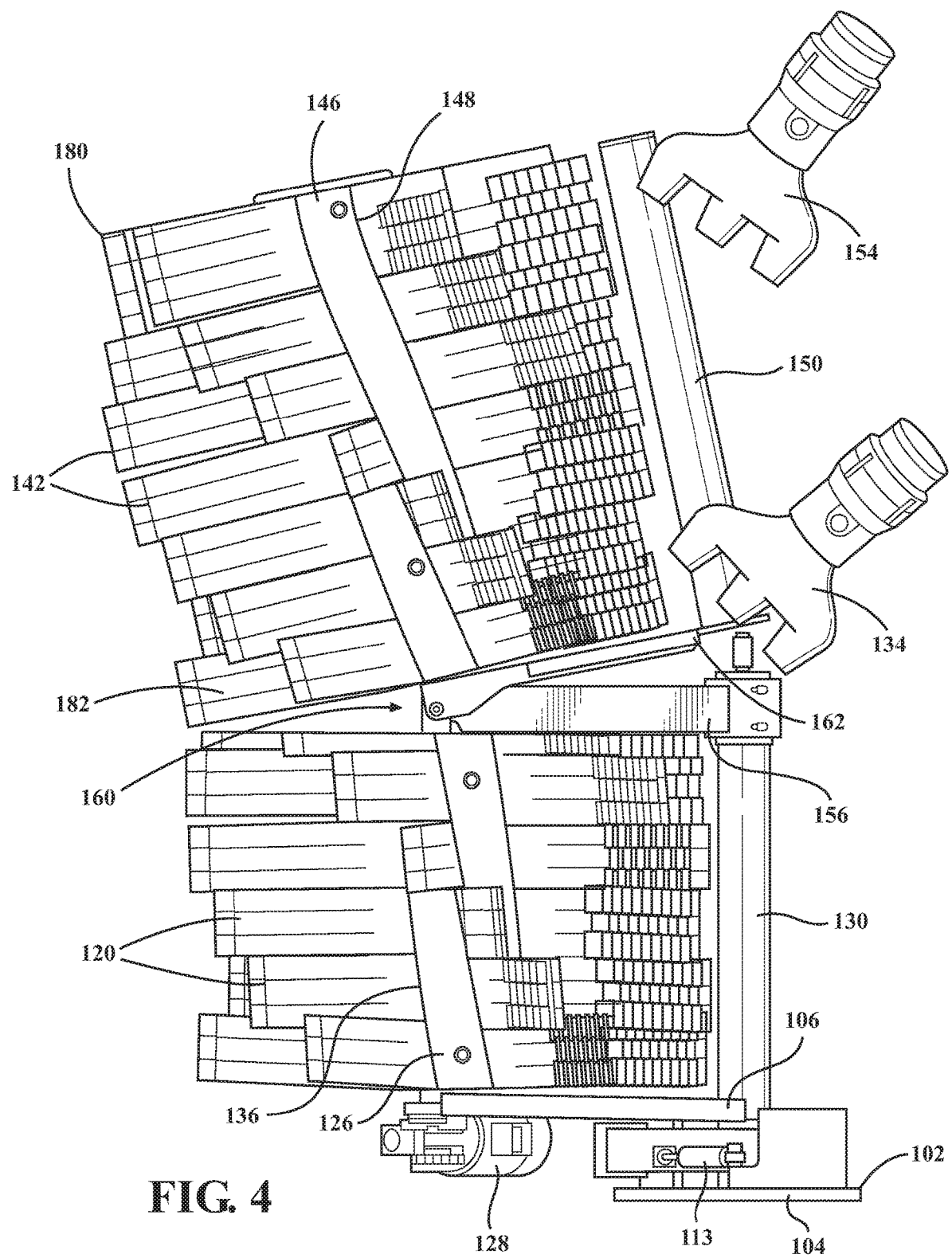
FIG. 4 is another side view of the vehicle wash component of FIG. 2 in an extended position.
Figure 5:
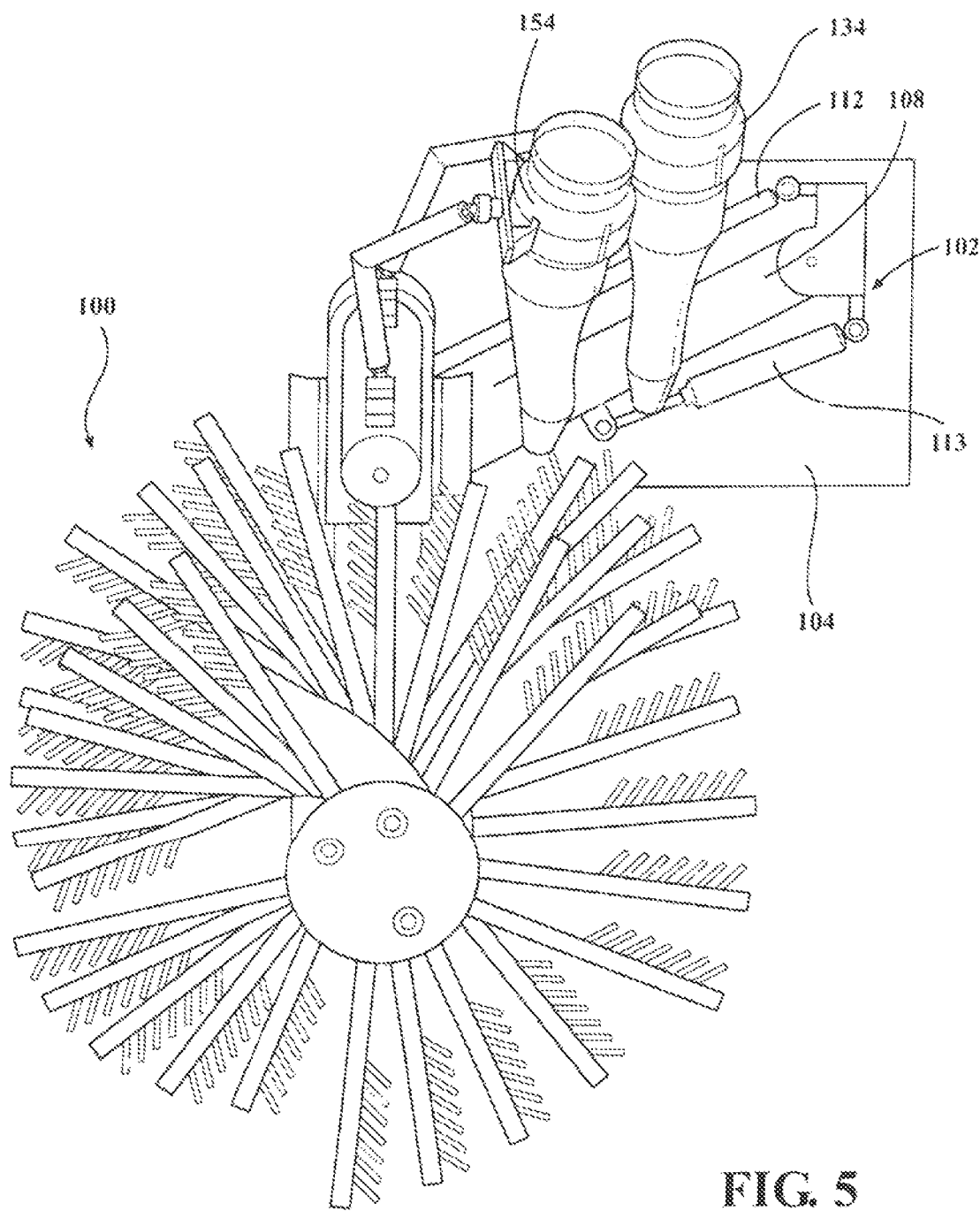
FIG. 5 is a top view of the vehicle wash component of FIG. 2 in an extended position.
Figure 6:
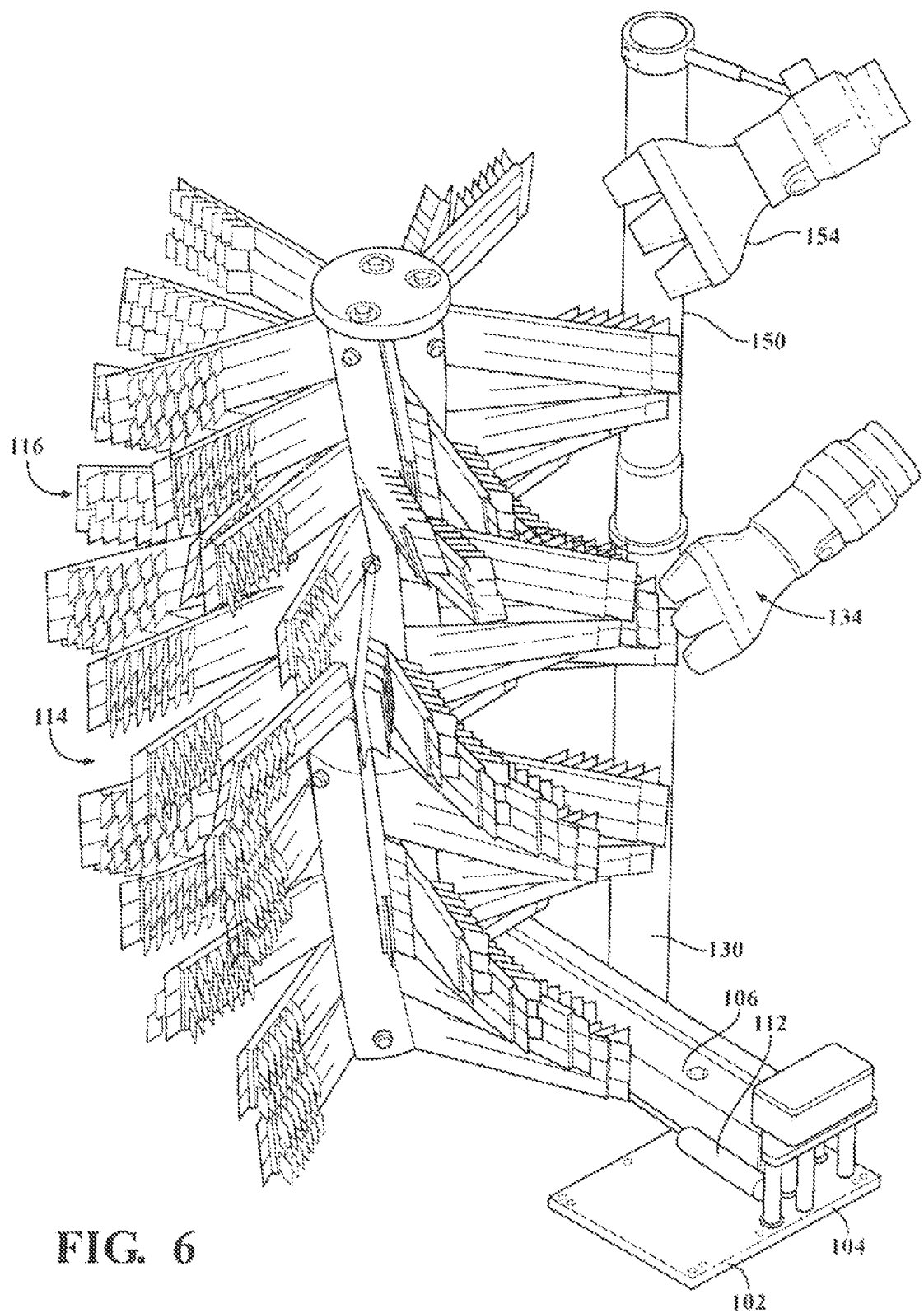
FIG. 6 is a perspective view of a vehicle wash component for a vehicle wash system in a retracted position in accordance with an aspect of the disclosure.

According to another aspect, the brush assembly 100 may include a base portion 102 that supports the brush assembly 100 adjacent the vehicle treatment area 36 such that it may be moved into and out of engagement with a vehicle exterior. As shown in the drawings, the base portion 102 may include a plate 104 that can be mounted to the floor of the vehicle wash facility 14. The base portion 102 can also include a swing arm 106 that extends generally linearly from the base 102 and can pivot with respect to the base portion 102. The brush assembly 100 may alternatively be secured and supported in a variety of different ways. According to another aspect, the swing arm 106 may include a first end 108 that is connected to the plate 104 and a second end 110 that is disposed remotely from the plate 104, as best shown in FIGS. 2 and 3. The first end 108 of the swing arm 106 may be pivotally connected to the plate 104 such that it can move between an extended position and a retracted position. When the swing arm 106 is in the extended position, the brush assembly 100 may be disposed in a position within the vehicle treatment area 36 for contacting the vehicle exterior. In the retracted position, the brush assembly 100 may be removed away from the vehicle treatment area 36 such that it is prevented from contacting the exterior surface of the vehicle 12. According to an aspect, movement of the swing arm 106 may be effectuated by a cylinder 112. According to another aspect, the cylinder 112 may be in communication with the controller 38 such that movement of the brush assembly 100 between the extended and retracted positions can occur automatically. The cylinder 112 may be pneumatic, hydraulic or any other suitable type. Also, any number of cylinders 112 may be employed. Alternatively, the swing arm 106 may be moved in a variety of other suitable ways and by a variety of other suitable mechanism. The swing arm 106 may also be in communication with a dampening shock 113 that serves to soften any vibration resulting from movement of the swing arm 106.

According to still another aspect, the brush assembly 100 may include a bottom brush portion 114 and a top brush portion 116. While the terms "top" and "bottom" are used herein, they are intended for orientation and illustration purposes only with respect to the drawings and are not intended in any way to be limiting. According to an aspect, the bottom brush portion 114 may be secured to the second end 110 of the swing arm 106. The bottom brush portion 114 may consist of a bottom rotary hub 118 with a plurality of bottom media elements 120 secured to the bottom rotary hub 118 for rotation therewith. The bottom rotary hub 118 defines an axis of rotation identified by $A_B$. According to a further aspect, the plurality of media elements 120 are generally self-supporting along their length and may include one or more cleaning heads 122 secured adjacent their outer ends. An exemplary bottom media element 120 is described in more detail in Applicant's co-pending U.S. patent application Ser. No. 13/668,058, entitled "Vehicle Wash Component", filed Nov. 2, 2012, now U.S. Pat. No. 8,990,993, the disclosure of which is hereby incorporated by reference. By this configuration, the bottom media elements 120 may extend outwardly for contact with a vehicle exterior. According to another aspect, the self-supporting nature of the bottom media elements 120 may provide a rotary brush with the same footprint both at rest and while rotating at high speeds. In other words, the media elements do not droop or sag while at rest. This configuration of the bottom media elements 120 allows the brush assembly 100 to be operated at lower speeds and still engage a vehicle exterior, which provides significant energy and cost savings as well as a drastic reduction in noise levels as compared to prior vehicle wash components. It will be appreciated that the bottom media elements 120 can take on a variety of different configurations and be constructed of a variety of different types of materials.

Figure 13:
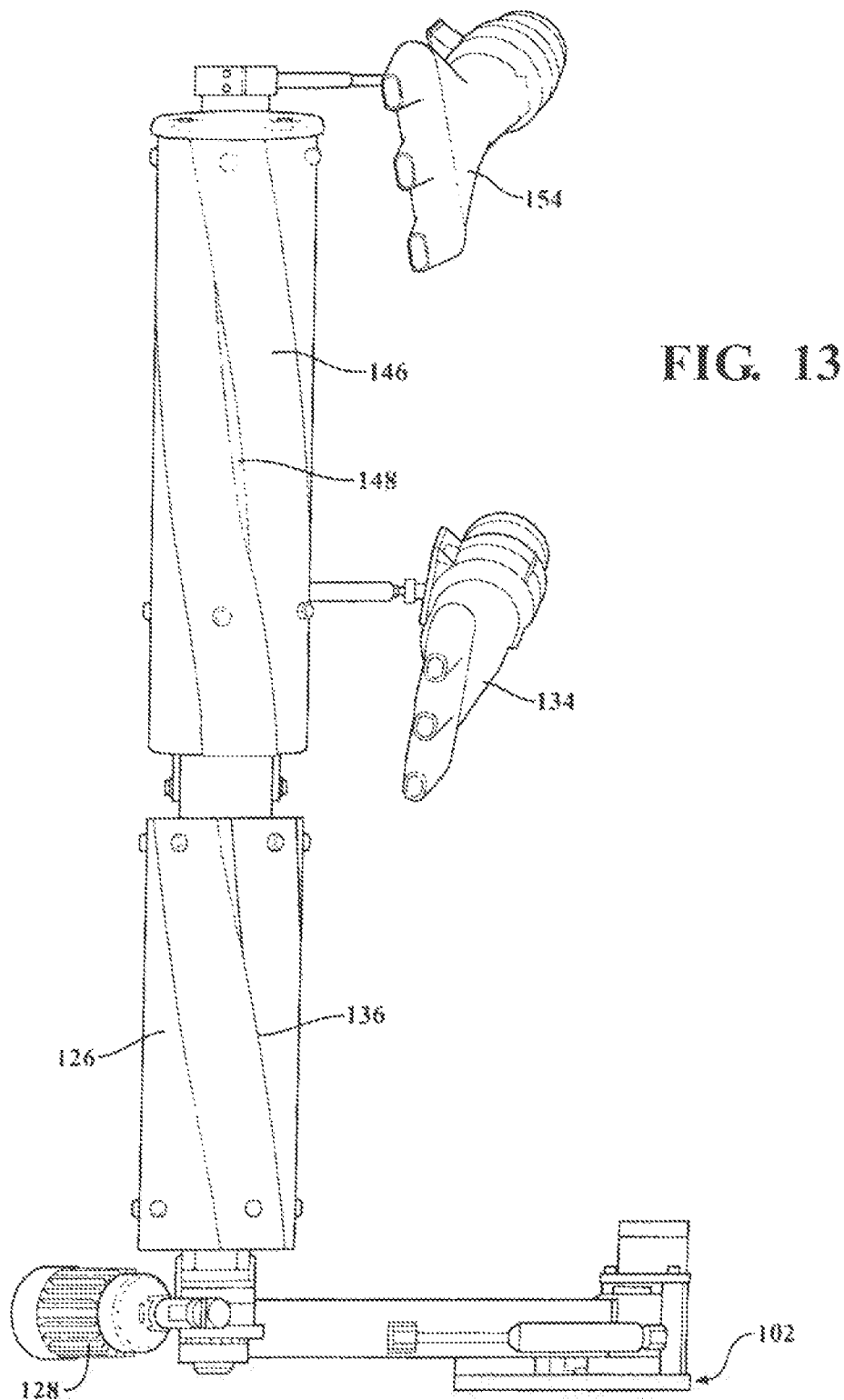
FIG. 13 is a side view of the hub and frame portion of FIG. 12 in a retracted position.
Figure 14:
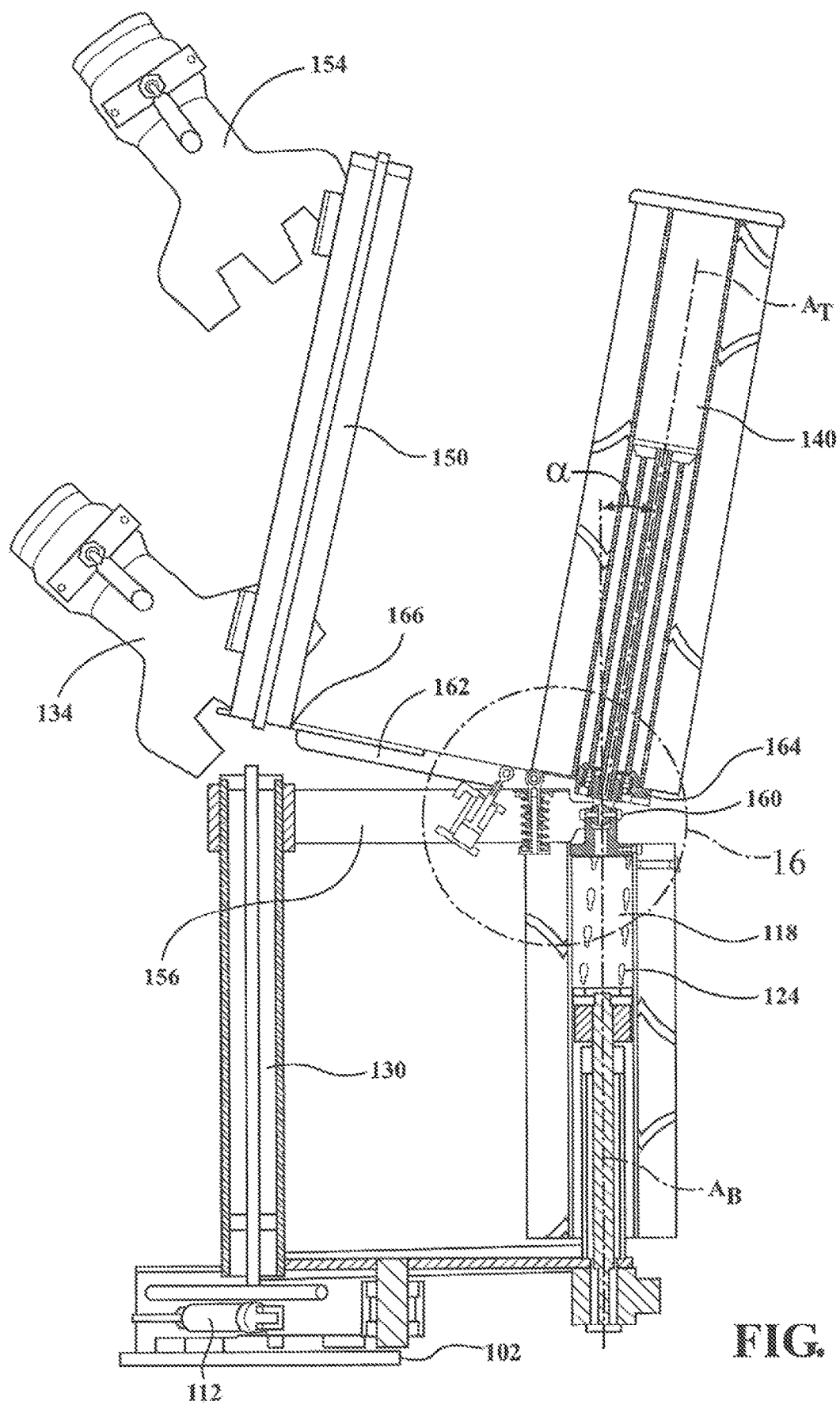
FIG. 14 is a side view of a hub and frame portion partially broken away in accordance with an aspect of the disclosure.

According to a further aspect and as best shown in FIG. 14, the bottom rotary hub 118 can include a plurality of keyholes 124 formed therein to allow attachment of the bottom media elements 120 thereto. According to an aspect, the plurality of bottom media elements 120 can each have a connector secured to an inner end thereof that is configured to mate with the keyholes 124 to facilitate attachment of the bottom media elements 120 to the bottom rotary hub 118. It will be appreciated that the bottom media elements 120 could be secured to the bottom rotary hub 118 in a variety of different ways and with a variety of different attachment mechanism. According to another aspect, the keyholes 124 may be disposed on the bottom rotary hub 118 such that the bottom media elements 120 are arranged in a plurality of spaced apart rows. According to an aspect, the rows may be linear. However, the rows may take on a variety of different configurations, including arcuate. With reference to FIGS. 9, 10, 12 and 13, according to still a further aspect, a plurality of lenses 126 may be secured to the bottom rotary hub 118. The lenses 126 may be secured to the bottom rotary hub 118 in a variety of suitable ways and in a variety of different orientations.

According to another aspect, a channel 136 may be formed between adjacent lenses 126 such that each channel 136 aligns with the keyholes 124 so that the plurality of bottom media elements 120 can be disposed in the channels 136 and secured to the keyholes 124. As shown, the channels 136 may be oriented at an angle with respect to the bottom axis of rotation $A_B$. By this configuration, each media element 120 in each row can make contact with a vehicle exterior at different times, which helps reduce noise. The lenses 126 may be configured as disclosed in Applicant's co-pending U.S. patent application Ser. No. 13/668,121, entitled "Hub for a Vehicle Wash Component Having an Arcuate Pattern of Media Elements", now U.S. Pat. No. 9,248,809, which is hereby incorporated by reference as though set forth fully herein. According to an aspect, the lenses 126 may be transparent or translucent and are preferably formed of a plastic material. Additionally, one or more light sources may be disposed on the bottom rotary hub 118 behind the lenses 126 such that they help transmit and disperse light outwardly from the bottom rotatable hub 118 as it is rotating and lights up the entire lenses 126.

According to a further aspect, a motor 128 may be placed in communication with the bottom rotary hub 118 to effectuate rotation thereof. According to an aspect, the motor 128 may be disposed adjacent the second end 110 of the swing arm 106. However, it will be appreciated that the motor 128 could be placed in a variety of different locations. Also, according to another aspect, the motor 128 may be in communication with the controller 38 to effectuate proper control of the brush assembly 100 as required in connection with the vehicle wash system 12. A variety of other suitable drive mechanism may be alternatively employed.

According to an aspect, the bottom brush portion 114 may be in communication with a lower manifold portion 130. The lower manifold portion 130 may be disposed behind (outwardly with respect to the vehicle treatment area 36) the bottom brush portion 114 and can be configured to emit fluid onto the bottom media elements 120. The lower manifold portion 130 may be in communication with a fluid source (not shown) such that fluid is provided thereto. According to an aspect, the lower manifold portion 130 may include a plurality of lower manifold nozzles 132 that are configured to emit fluid onto the bottom brush portion 114. The fluid source is preferably water, however, a variety of other suitable fluids may also be employed such as a soapy water or detergent. It will also be appreciated that the lower manifold portion 130 could be incorporated into the bottom rotary hub 118 or into a variety of other suitable locations. The plurality of lower manifold nozzles 132 may be in communication with the controller 38 so that the timing of fluid emission may be properly timed and may occur automatically.

According to another aspect, a first bubble nozzle portion 134 may be placed in communication with the bottom brush portion 114 to emit bubbles onto the plurality of bottom media elements 120. The first bubble nozzle portion 134 may be configured to emit singular discrete bubbles having a substantial shape (as opposed to suds or foam) that cling to the media elements 120 of the bottom brush portion 114 as it rotates so that the bubbles can be applied to the exterior of the vehicle 12 in the vehicle treatment area 26. The first bubble nozzle portion 134 may be configured as shown and described in Applicant's co-pending U.S. patent application Ser. No. 13/864,813, entitled "A Vehicle Wash Component for Emitting Bubbles", filed Apr. 17, 2013, now U.S. Pat. No. 10,207,686, which is hereby incorporated by reference as though set forth fully herein. It will be appreciated that other devices for emitting bubbles may be employed. Additionally, according to an aspect, the lower manifold portion 130 may be eliminated altogether such that the only fluid emitted onto the bottom brush portion 114 comes from the bubbles. According to another aspect, the first bubble nozzle portion 134 could be configured to emit bubbles directly onto the vehicle exterior. Alternatively, the lower manifold portion 130 could be directed by the controller 38 to emit fluid through the lower manifold nozzle 132 intermittently as needed. It will also be appreciated that the nozzle could be configured to emit foam.

According to another aspect, the top brush portion 116 may have the same configuration as the bottom brush portion 114. It will be appreciated that the top brush portion 116 and the bottom brush portion 114 could also have different configurations. According to an aspect, the top brush portion 116 may consist of a top rotary hub 140 with a plurality of upper media elements 142 secured to the top rotary hub 140 for rotation therewith. According to an aspect, the top rotary hub 140 defines an axis of rotation identified by $A_T$. According to a further aspect, the plurality of upper media elements 142 are generally self-supporting along their length and may include one or more cleaning heads 144 secured adjacent their outer ends and may have the same configuration, as discussed above. According to an aspect, the media elements 142 may extend outwardly for contact with a vehicle exterior and may have the same general footprint while at rest and while rotation at high speeds. This allows the top brush portion 116 to be operated at lower speeds and still engage a vehicle exterior, which provides significant energy and cost savings as well as a drastic reduction in noise levels as compared to prior vehicle wash components. It will be appreciated that the upper media elements 142 can take on a variety of different configurations and be constructed of a variety of different types of materials.

According to a further aspect and as shown in FIG. 14, the top rotary hub 140 can include a plurality of keyholes 145 formed therein to allow attachment of the upper media elements 142 thereto. According to an aspect, the plurality of upper media elements 142 can each have a connector secured to an inner end thereof that is configured to mate with the keyholes 145 to facilitate attachment of the upper media elements 142 to the top rotary hub 140. It will be appreciated that the upper media elements 142 could be secured to the top rotary hub 140 in a variety of different ways and with a variety of different attachment mechanism. According to another aspect, the keyholes 145 may be disposed on the top rotary hub 140 such that the upper media elements 142 may be arranged in a plurality of spaced apart rows. According to an aspect, the rows may be linear. However, the rows may take on a variety of different configurations, including arcuate. According to still a further aspect, a plurality of lenses 146 may be disposed in between the spaced apart rows of media elements 142.

According to still another aspect, a channel 148 may be formed between adjacent lenses 146 such that each channel 148 aligns with the keyholes 145 so that the plurality of upper media elements 142 can be disposed in the channels 148 and secured to the keyholes 145. As shown, the channels 148 may be oriented at an angle with respect to the upper axis of rotation $A_T$. By this configuration, each upper media element 142 in each row can make contact with a vehicle exterior at different times, which helps reduce noise. The lenses 146 may be secured to the top rotary hub 140 in a variety of suitable ways. According to an aspect, the lenses 146 may be translucent and are preferably formed of a plastic material. Additionally, one or more light sources may be disposed on the top rotary hub 140 behind the lenses 146 such that they help transmit and disperse light outwardly from the top rotary hub 140 as it is rotating.

According to an aspect, the top brush portion 116 is also in communication with an upper manifold portion 150. The upper manifold portion 150 may be disposed behind (outwardly with respect to the vehicle treatment area 36) the top brush portion 116 and can be configured to emit fluid onto the upper media elements 142. The upper manifold portion 150 is in communication with a fluid source (not shown) such that the fluid is applied thereto. According to an aspect, the upper manifold portion 150 may include a plurality of upper manifold nozzles 152 that are configured to emit fluid onto the top brush portion 116. According to an aspect, the top brush portion 116 is connected to the upper manifold portion 150 by an upper support arm 156. The fluid source is preferably water, however, a variety of other suitable fluids may also be employed such as soapy water or detergent. It will be appreciated that the upper manifold portion 150 could be incorporated into the top rotary hub 140 or be located in a variety of other suitable locations. The plurality of upper manifold nozzles 152 may be in communication with the controller 38 so that the fluid emission may be properly timed.

According to another aspect, an upper bubble nozzle portion 154 may be placed in communication with the top brush portion 116 to emit bubbles onto the plurality of upper media elements 142. The upper bubble nozzle portion 154 may be configured to emit singular discrete bubbles having a substantial shape (as opposed to suds or foam) that cling to the upper media elements 142 of the top brush portion 116 as it rotates so that the bubbles can be applied to the exterior of the vehicle 12 in the vehicle treatment area 26. The upper bubble nozzle portion 154 may be configured, as discussed above. It will be appreciated that other devices for emitting bubbles may be employed. Additionally, according to an aspect, the upper manifold portion 150 may be eliminated altogether such that the only fluid emitted onto the upper brush portion 116 comes from the bubbles. Alternatively, the upper manifold portion 150 could be directed by the controller to emit fluid through the upper manifold nozzles 152 intermittently as needed. Again, the nozzle portion 154 could be configured to emit foam.

Figure 15:
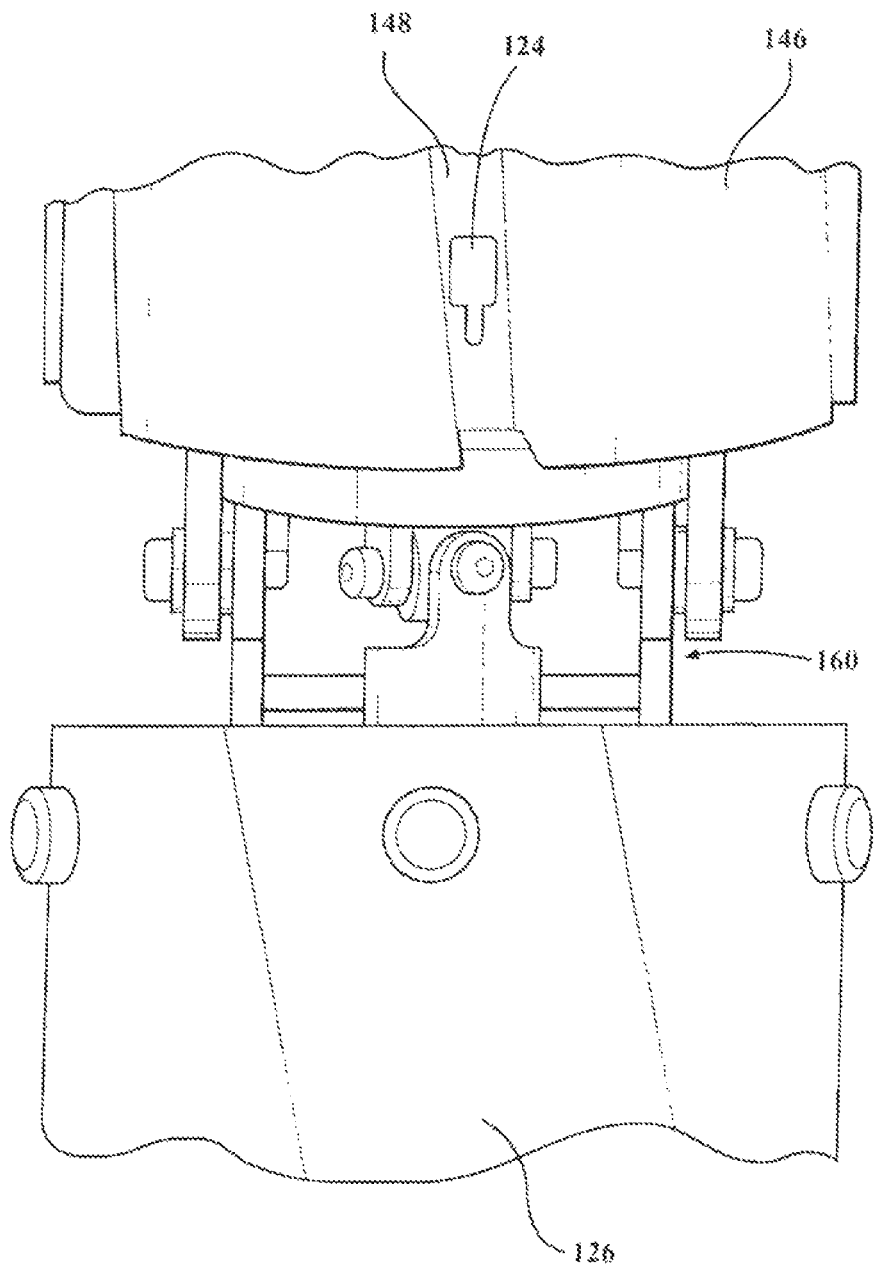
FIG. 15 is an enlarged view of the area within the circle 15 in FIG. 9.
Figure 16:
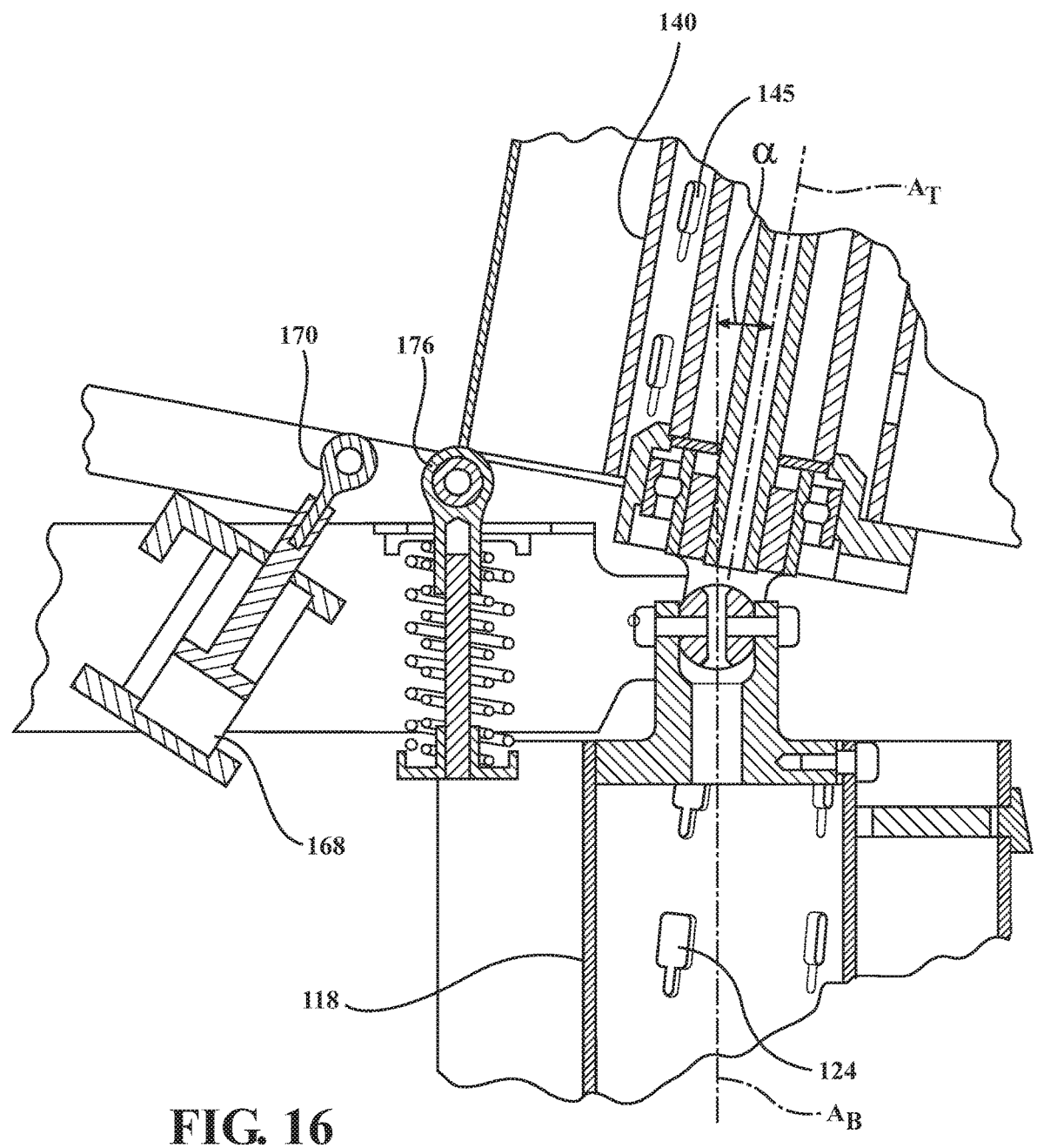
FIG. 16 is an enlarged view of the area within the circle 16 in FIG. 14.

With reference to FIGS. 15 and 16, according to an aspect, the top brush portion 116 may be coupled to the bottom brush portion 114 by a connector 160. According to an aspect, the connector 160 may couple the top brush portion 116 to the bottom brush portion 114 such that they are rotatably coupled and can rotate in unison as directed by the motor 128. According to another aspect, the connector 160 also allows the bottom brush portion 114 to be pivoted with respect to the top brush portion 116. This may allow the top brush portion 116 to be tilted with respect to the bottom brush portion 114 such that an angle between them can be varied. According to another aspect, the connector 160 may be an angular misalignment coupling or flexible coupling, however, a variety of other suitable connectors may be utilized, including a u-joint. According to a further aspect, the top brush portion 116 may rotate independently of the bottom brush portion 114.

Additionally, as shown, a connector bar 162 may extend between the upper manifold portion 150 and the top brush portion 116 to provide support thereto. The connector bar 162 may have an inner end 164 that is in pivotal communication with the connector 160 and an outer end 166 that is connected to the upper manifold portion 150. According to an aspect, the connector bar 162 may be in communication with an actuator 168 to effectuate movement thereof, as discussed below. The actuator 168 may be a plurality of pneumatic cylinders. However, a variety of other cylinders or actuator mechanism may be employed. According to a still further aspect, the actuator 168 may be in communication with the controller 38 to effectuate automatic movement of the top brush portion 116 as needed during the vehicle wash process. As shown, the actuator 168 has an upper end 170 secured to the connector bar 162 and a lower end 172 secured to the upper support arm 156. As also shown, a spring 174 has an upper end 176 secured to the connector bar 162 and a lower end 178 secured to the upper support arm 156.

Figure 7:
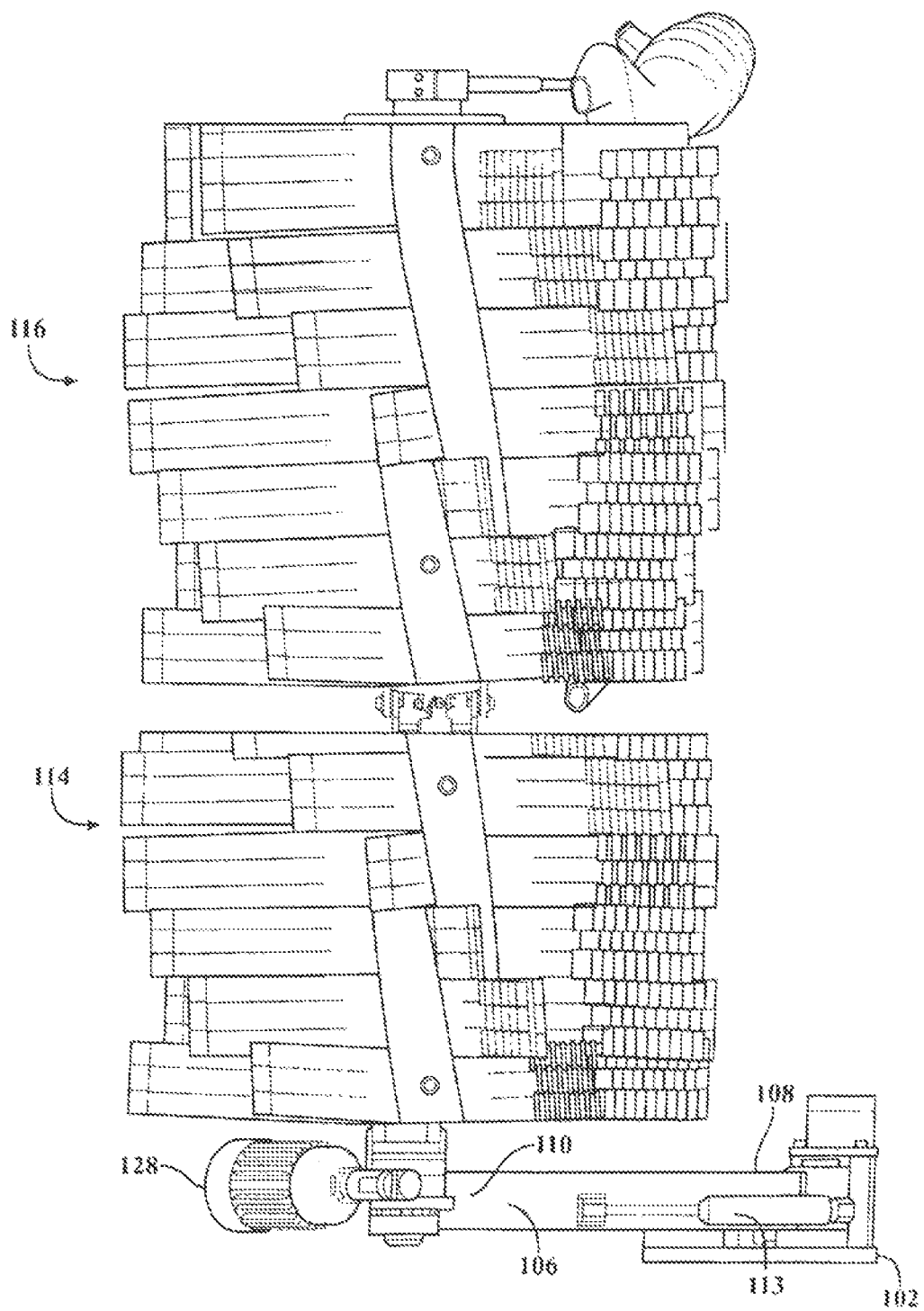
FIG. 7 is a first side view of the vehicle wash component of FIG. 6 in a retracted position.
Figure 8:
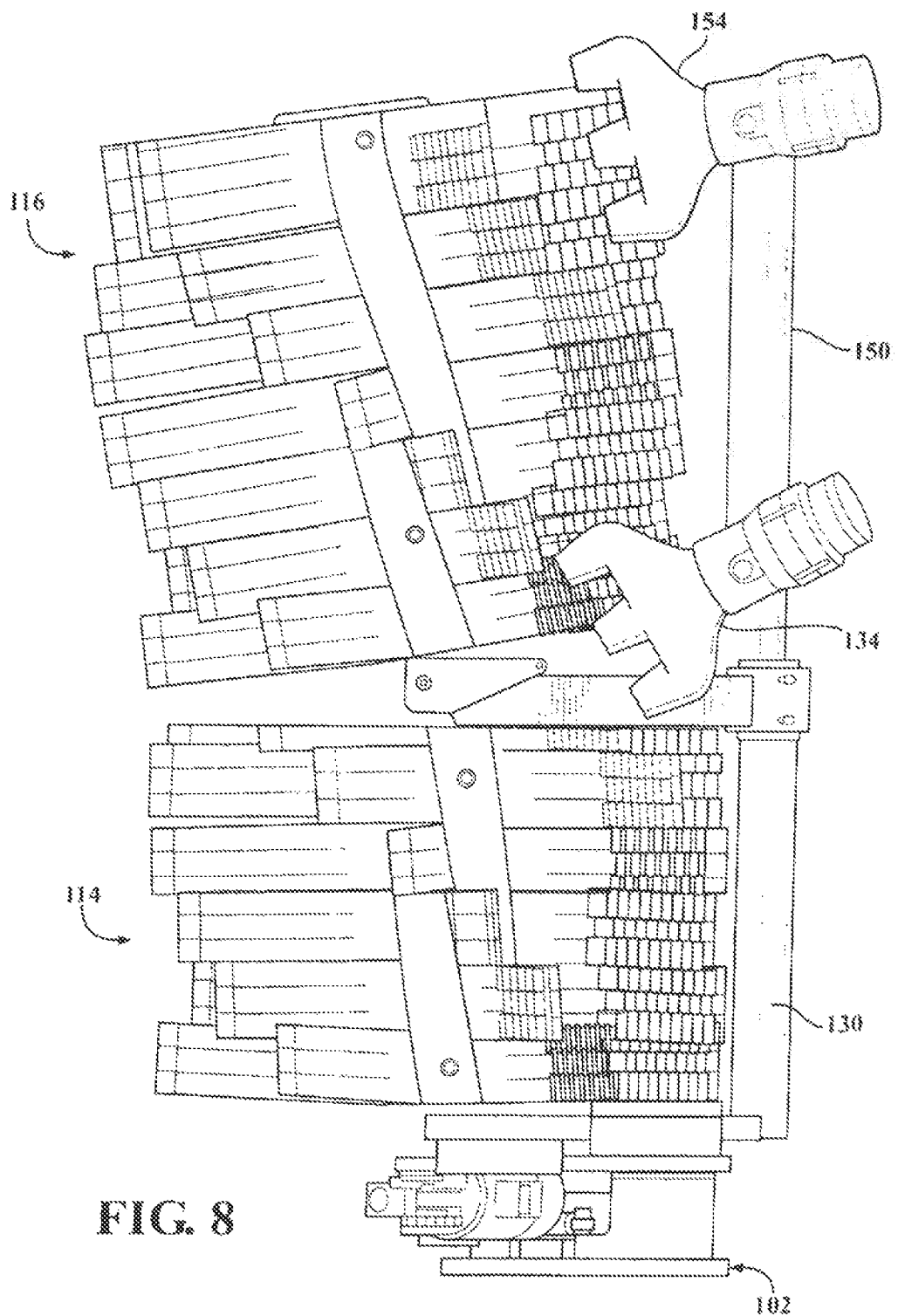
FIG. 8 is another side view of the vehicle wash component for FIG. 6 in a retracted position.
Figure 9:
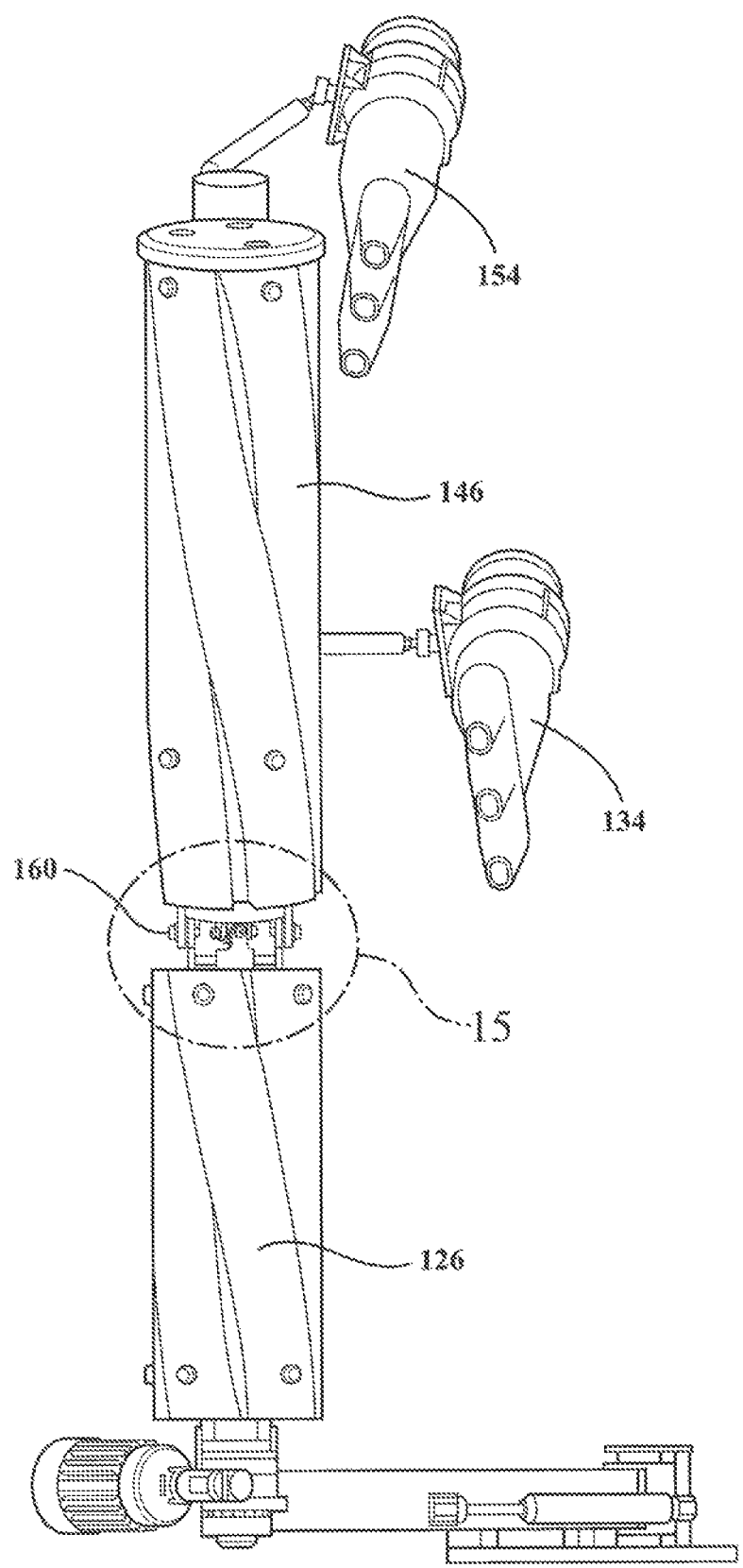
FIG. 9 is a first side view of the hub and frame portion of a vehicle wash component in an extended position in accordance with an aspect of the disclosure.
Figure 10:
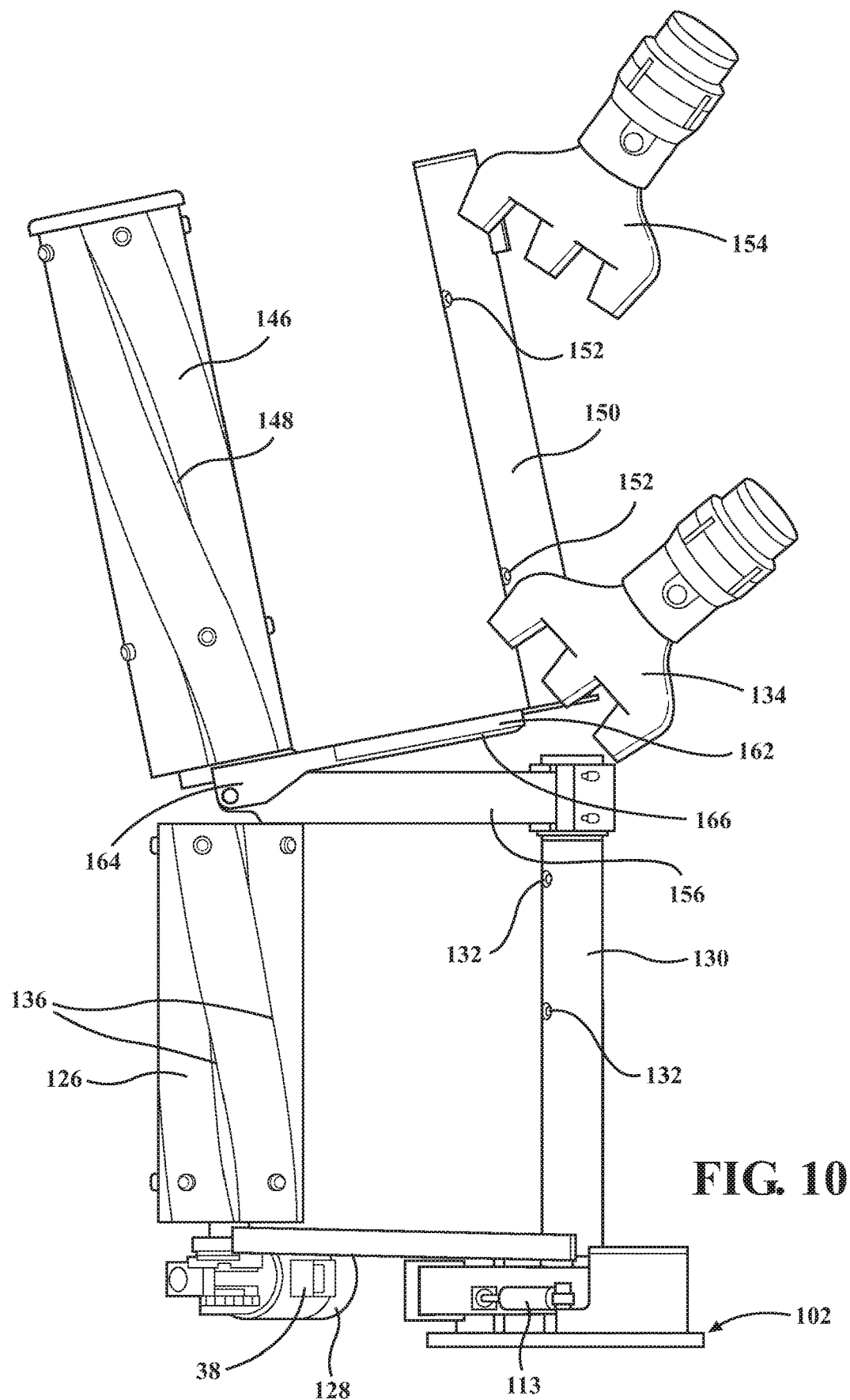
FIG. 10 is another side view of the hub and frame portion of FIG. 9 in an extended position.
Figure 11:
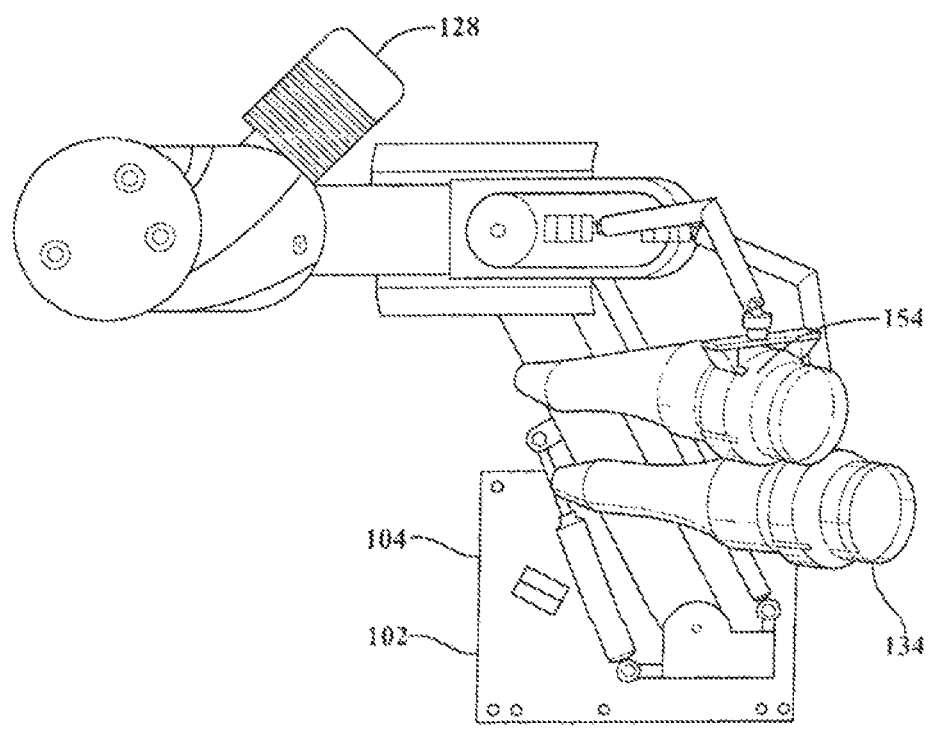
FIG. 11 is top view of the hub and frame portion of FIG. 9 in an extended position.
Figure 12:
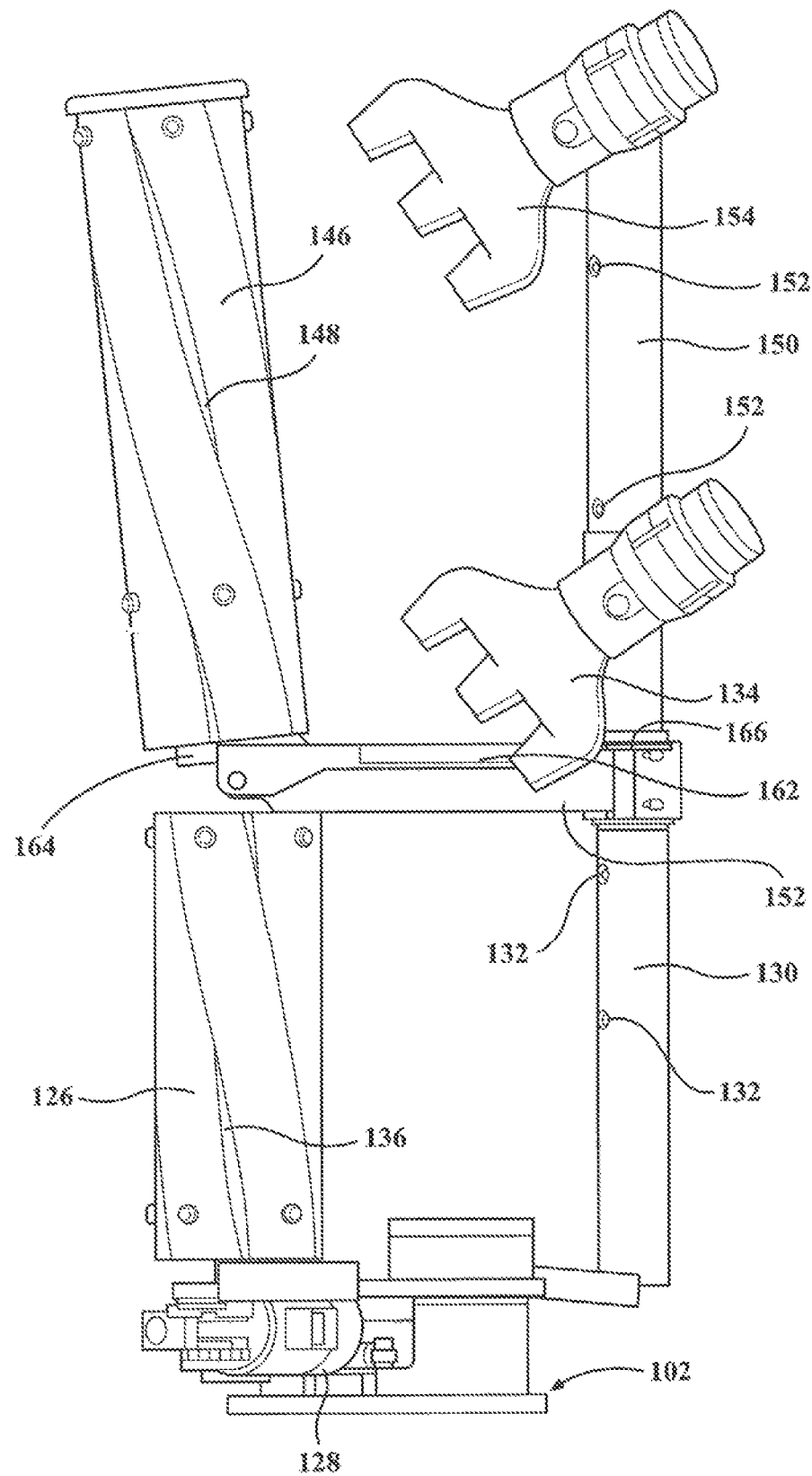
FIG. 12 is a side view of the hub and frame portion of a vehicle wash component in a retracted position in accordance with an aspect of the disclosure.

The actuator 168 may effectuate pivotal movement of the connector bar 162 such that the top brush portion 116 may be moved from a retracted position to a deployed position. In the retracted position, the top brush portion 116 is biased inwardly by the actuator 168 as best shown in FIGS. 7, 8 and 13, in the retracted position the axis of rotation $A_B$ may be generally parallel with the axis of rotation $A_T$ and both axes may be oriented generally vertically within the facility and with respect to one another. As used herein, the term "vertically" encompasses a configuration where generally the axis of rotation $A_B$ may be at a slight angle with respect to the axis of rotation $A_T$, such as 5 degrees, so that it is biased for contacting a vehicle with sufficient pressure to promote effective cleaning. It will be appreciated that the starting angle between the axis of rotation $A_B$ and $A_T$ in the retracted position may vary. For example, it could be 0 degrees such that they are both entirely in line and could be greater than 5 degrees.

In the deployed position, the outer end 166 of the connector bar 162 may be raised by lifting of the upper end 170 of the actuator such that the connector bar 162 pivots about its inner end 164. As the actuator 168 pivots, the upper end 176 of the spring 174 is pulled upwardly against the spring force bias. To move to the deployed position, the actuator 168 may lower the connector bar 162 with assistance from the force of spring 174. This can cause the upper end 180 of the top brush portion 116 to pivot inwardly toward the vehicle treatment area 36 with respect to a lower end 180 of the top brush portion 116. By this orientation, the upper media elements 142 extend further into the vehicle treatment area 36 and thus can provide increased contact with an angled surface of a vehicle 12. As shown, in the deployed position, the axis of rotation AT may be disposed at angle a with respect to the axis of rotation AB. Again, the top brush portion 116 may be biased inwardly to apply force to a vehicle for effective cleaning. According to an aspect, the actuator 168 may be configured to allow the angle to vary as dictated by the exterior surface of the vehicle.

According to an aspect, the angle α in the deployed position may be between 5 degrees and 25 degrees. According to another aspect, the angle α at which the axis of rotation $A_T$ is disposed with respect to the axis of rotation $A_B$ may vary. For example, the initial starting angle may vary. Also, the operating angle as dictated by the vehicle exterior may also vary. It will be appreciated that a variety of suitable ways to move the top brush portion 116 from the retracted position to the deployed position may be utilized.

According to one example, when the top brush portion 116 is moved to the deployed position, the controller 38 may direct the actuator 168 to move the top brush portion 116 to a fixed predetermined angle α, i.e., 20 degrees. According to another aspect, the controller 38 may be in communication with a variety of sensors utilized in the vehicle wash system 10 to gather information about the vehicle, including its width and any contours. This vehicle information may be fed to the controller 38 and then utilized to determine the angle α at which to orient the axis of rotation $A_T$ with respect to the axis of rotation $A_B$. For example, the controller 38 may receive information about the configuration and angle of the upper exterior surface of the vehicle 12 from one or more sensors. Based on this information, the controller 38 could determine the angle α at which to adjust the top brush portion 116 in order to provide efficient cleaning of all vehicle surfaces. Moreover, the exterior of a vehicle could contact the top brush portion 116 during operation and move it outwardly against the force of the actuator 168 to vary the angle and accommodate the configuration of the vehicle exterior as assisted by the spring 174. By this configuration, the angle that the top brush portion extends inwardly can consistently vary to provide efficient cleaning.

It will be appreciated that while according to one aspect, the top brush portion 116 may be configured to pivot with respect to the bottom brush portion 114 such that the top brush portion 116 is angled inwardly with respect to the bottom brush portion 114, according to another aspect, the top brush portion 116 could be configured to pivot outwardly (away from the vehicle treatment area 36) with respect to the bottom brush portion 114. According to a still further aspect, the bottom brush portion 114 could be configured to pivot either inwardly toward or outwardly away from the vehicle treatment area 26 with respect to the top brush portion 116. Still further, both the top brush portion 116 and the bottom brush portion 114 could be configured to pivot at the same time such they each create angles with respect to a vertical axis of rotation.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. A vehicle wash component, comprising:
a brush assembly configured to be disposed adjacent a vehicle treatment area of a vehicle wash facility, the brush assembly including:

an upper brush portion including a plurality of upper wash media elements coupled to an upper rotary hub portion, the upper rotary hub portion having an upper distal end, an upper proximate end and an upper axis of rotation;

a lower brush portion including a plurality of lower wash media elements coupled to a lower rotary hub portion, the lower rotary hub portion having a lower distal end, a lower proximate end and a lower axis of rotation, wherein the lower axis of rotation is oriented generally vertically with respect to ground of the vehicle wash facility;

the upper brush portion coupled to the lower brush portion such that the upper axis of rotation is oriented at an acute angle with respect to the lower axis of rotation whereby the upper distal end is closer to a vehicle treatment area than the upper proximate end; and a biasing mechanism configured to self-adjust the acute angle of the upper axis of rotation with respect to the lower axis of rotation in response to contact with a vehicle exterior by the plurality of upper wash media elements such that the upper brush portion can follow contours of the vehicle exterior.

2. The component of claim 1, wherein the biasing mechanism includes an actuator configured to urge upper distal end of the upper brush portion toward the vehicle treatment area in order to apply a cleaning force to the vehicle exterior when in the vehicle treatment area.

3. The component of claim 2, wherein the actuator consists of one of a hydraulic or pneumatic cylinder.

4. The component of claim 1, further comprising:
a base portion for supporting the brush assembly, wherein the brush assembly is pivotally coupled to the base portion and is moveable between a first non-vehicle engaging position and a second vehicle engaging position.

5. The component of claim 1, further comprising:
an upper fluid nozzle in communication with the upper brush portion and configured to emit fluid onto the plurality of upper wash media elements to assist with cleaning the vehicle exterior.

6. The component of claim 5, further comprising:
a lower fluid nozzle in communication with the lower brush portion and configured to emit fluid onto the plurality of lower wash media elements to assist with cleaning the vehicle exterior.

7. The component of claim 1 wherein the plurality of upper wash media elements are constructed of a self-supporting material such that they retain an elongated shape and extend from the upper rotary hub in a generally perpendicular manner while the upper rotary hub is at rest;
wherein the plurality of upper wash media elements include a front face and are configured to flex when in contact with the vehicle exterior such that a treatment area on the front face engages the vehicle exterior to assist with the cleaning process.

8. The component of claim 7 wherein the plurality of lower wash media elements are constructed of a self-supporting material such that they retain an elongated shape and extend from the lower rotary hub in a generally perpendicular manner while the lower rotary hub is at rest;
wherein the plurality of lower wash media elements include a front face and are configured to flex when in contact with the vehicle exterior such that a treatment area on the front face engages the vehicle exterior to assist with the cleaning process.

9. The component of claim 1, wherein the acute angle between upper axis of rotation and the lower axis of rotation varies between 5 and 25 degrees.

10. The component of claim 1, wherein the biasing mechanism further includes a counter-balance device configured to urge the upper first brush portion in a direction away from the vehicle treatment area.

11. The component of claim 10, wherein the counter-balance device is a spring.

12. The component of claim 1, wherein the upper hub portion is rotatably coupled to the lower hub portion such that they rotate together in unison.

13. The component of claim 12, wherein the upper hub portion is rotatably coupled to the lower hub portion by a flexible coupling.

14. The component of claim 13, wherein the flexible coupling consists of a u-joint.

15. A vehicle wash component, comprising:
a frame portion configured to be disposed adjacent a vehicle treatment area of a vehicle wash facility;
a brush assembly coupled to the frame portion and moveable between a first non-vehicle engaging position and a second vehicle engaging position, the brush assembly comprising:
an upper brush portion including a plurality of upper wash media elements coupled to an upper rotary hub having an upper distal end and an upper proximate end opposite the upper distal end, the upper rotary hub defining an upper axis of rotation;
a lower brush portion including a plurality of lower wash media elements coupled to a lower rotary hub with a lower distal end and a lower proximate end opposite the lower distal end, the lower rotary hub defining a lower axis of rotation;
the upper brush portion coupled to the frame such that the upper distal end can move between a first position where the upper axis of rotation is disposed at a first angle with respect to the lower axis of rotation and a second position where the upper axis of rotation is disposed at a second angle with respect to the lower axis of rotation, wherein the first angle and the second angle are different;
a biasing mechanism in communication with the upper brush portion to urge it toward the vehicle treatment area, whereby the plurality of upper wash media elements apply a cleaning force to the exterior surface;
whereby the upper brush portion can self-adjust between the first angle and the second angle upon contact with the exterior surface.

16. The component of claim 15, wherein the first angle is about 5 degrees and the second angle is greater than 5 degrees.

17. The component of claim 16, wherein the second angle is less than 25 degrees.

18. The component of claim 15, wherein the first angle is about 0 degrees and the second angle is greater than 5 degrees and less than 25 degrees.

19. The component of claim 15, wherein the biasing mechanism is selected from one of a hydraulic cylinder or a pneumatic cylinder.

20. The component of claim 15, wherein the frame includes an arm portion that is coupled to the upper brush portion and movement of the arm portion by the biasing mechanism effects a change in inclination of the upper axis of rotation with respect to the lower axis of rotation.

21. The component of claim 15, wherein the upper distal end of the upper brush assembly is not directly supported by the frame portion.

22. The component of claim 15, further comprising:
a second biasing mechanism configured to urge the upper brush portion away from the vehicle treatment area.

23. The component of claim 22, wherein the second biasing mechanism is a spring.

24. The component of claim 15, further comprising:
at least one spray nozzle coupled to the frame for emitting fluid in a direction of a vehicle treatment area to assist the plurality of upper media elements in cleaning an exterior surface of the vehicle.

25. The component of claim 15, wherein the upper wash media elements are substantially self-supporting along their length such that they extend substantially perpendicularly from the upper rotary hub when at rest.

26. A vehicle wash component for treating at least a side surface of a vehicle, the side surface having an upper exterior portion and a lower exterior portion, comprising:
a frame portion configured to be disposed adjacent a vehicle treatment area of a vehicle wash facility;
a lower brush portion supported by the frame portion, the lower brush portion including a lower hub portion defining a first axis of rotation that is oriented generally perpendicular to ground of the vehicle wash facility, the lower brush portion having a plurality of lower wash media elements coupled thereto;
the lower brush portion supported on the frame such that the first axis of rotation is oriented so it generally parallel to the lower exterior portion of the side surface of the vehicle;
an upper brush portion supported by the frame portion, the upper brush portion including an upper hub portion defining a second axis of rotation and a plurality of upper wash media elements secured to the upper hub portion for engaging an upper exterior surface of the vehicle;
the upper brush portion supported by the frame such that the second axis of rotation is at an inward angle toward the vehicle treatment area with respect to the first axis of rotation such that it matches the upper portion of the side surface of the vehicle;
a self-contouring mechanism supported by the frame and in communication with the upper brush portion, the self-contouring mechanism being configured to allow the inward angle to vary based on contact of the plurality of upper wash media elements with the exterior surface of the vehicle;
whereby the second axis of rotation is oriented generally parallel to the upper exterior surface of the vehicle when the upper brush portion is in contact therewith.

27. The component of claim 26, wherein the self-contouring mechanism includes an actuator configured to bias the upper brush portion toward the vehicle treatment area.

28. The component of claim 27, wherein the actuator is selected from one of a hydraulic or pneumatic cylinder.

29. The component of claim 26, wherein the self-contouring mechanism includes a biasing mechanism configured to bias the upper hub portion in a direction away from the upper exterior surface of the vehicle.

30. The component of claim 29, wherein biasing mechanism is a spring.

31. The component of claim 26, wherein the self-contouring mechanism is configured to allow the inward angle to vary between 5 degrees and 25 degrees with respect to the second axis of rotation.

32. The component of claim 26, wherein the frame portion is pivotally supported by a base portion and wherein the frame portion is moveable between an extended position where the lower brush portion and the upper brush portion are disposed in a position to contact the exterior surface of the vehicle and a retracted position where the lower brush portion and the upper brush portion are disposed away from the vehicle treatment area.

33. The component of claim 26, further comprising:
at least one spray nozzle coupled to the frame for emitting fluid in a direction of a vehicle treatment area to assist the plurality of upper wash media elements in cleaning the exterior surface of the vehicle.

34. The component of claim 26, wherein the frame includes an arm portion that is coupled to the upper brush portion and movement of the arm portion by the self-contouring mechanism effects a change in the inward angle.

35. The component of claim 26, wherein the upper brush portion is not directly supported by the frame portion.

36. A vehicle wash component comprising:
a frame portion configured to be disposed adjacent a vehicle treatment area;
an upper brush portion supported by the frame portion and having an upper end and a lower end, the upper brush portion defining a first axis of rotation, the upper brush portion including a plurality of upper media elements configured to contact an upper portion of the vehicle exterior;
a lower brush portion supported on the frame below the upper brush portion and having an upper end and a lower end, the lower brush portion defining a second axis of rotation, which is oriented generally perpendicular to ground while the lower brush portion rotates, the lower brush portion including a plurality of lower media elements configured to contact a lower portion of the vehicle exterior;
the upper brush portion being rotatably connected to the lower brush portion;
a drive assembly in communication with the upper brush portion and the lower brush portion to rotate them about the first axis of rotation and the second axis of rotation respectively in unison;
wherein the upper brush portion is disposed on the frame such the upper end of the upper brush portion is disposed inwardly with respect to a vehicle treatment area as compared to the lower end of the upper brush portion such that the first axis of rotation is at an acute angle with respect to the second axis of rotation.

37. The component of claim 36, wherein the acute angle can vary based on contact of the upper brush portion with the upper portion of the vehicle exterior to maintain force on the vehicle exterior.

38. The component of claim 37, further comprising:
an actuator disposed on the frame and configured to bias the upper brush portion inwardly toward the vehicle treatment area.

39. The component of claim 38, wherein the actuator is selected from one of a hydraulic cylinder and a pneumatic cylinder.

40. The component of claim 38, further comprising:
a biasing mechanism to urge the upper brush portion away from the vehicle exterior.

41. The component of claim 40, wherein the biasing mechanism is a spring.

42. The component of claim 37, wherein the acute angle has a lower value of about 5 degrees.

43. The component of claim 42, wherein the acute angle is greater than 5 degrees and less than 25 degrees.

44. The component of claim 37, wherein the frame portion includes an arm portion that is coupled to the upper brush portion and movement of the arm portion effects a change in inclination of the first axis of rotation with respect to the second axis of rotation.

45. The component of claim 37, wherein the upper distal end of the upper brush portion is not directly supported by the frame portion.

* * * * *